April 28, 1942.
K. A. OPLINGER
2,281,044
ELECTRICAL SWITCHING APPARATUS
Filed Aug. 6, 1941
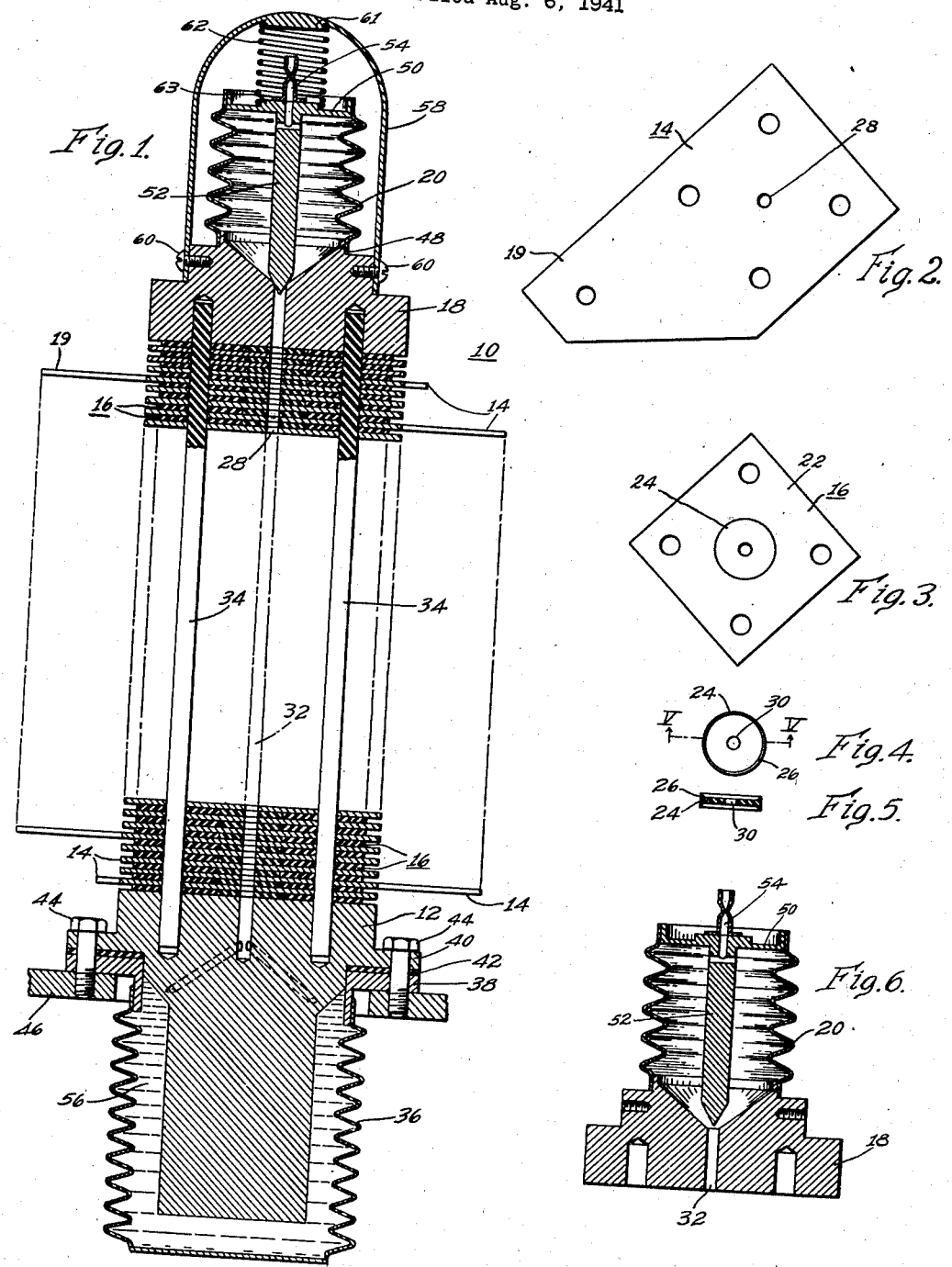
INVENTOR
Kirk A. Oplinger.
BY
James M. Ely
ATTORNEY Patented Apr. 28, 1942

2,281,044

UNITED STATES PATENT OFFICE 2,281,044

ELECTRICAL SWITCHING APPARATUS

Kirk A. Oplinger, Verona, Pa., assignor to Westinghouse Electric & Manufacturing Company, East Pittsburgh, Pa., a corporation of Pennsylvania Application August 6, 1941, Serial No. 405,585

6 Claims. (Cl. 200—152)

This invention relates to electrical switching apparatus.

An object of this invention is to provide in a sealed switching apparatus which utilizes a switching fluid for effecting a switching operation and a gas for reducing arcing, for separating the gas and switching fluid under predetermined conditions to maintain them substantially free of each other.

Another object of this invention is to provide in a switching apparatus formed of a plurality of alternately stacked conductor members and spacer members bonded together to provide a well in which a switching fluid is disposed to be delivered by a movement of the bellows to progressively bridge the contact members and which is provided with a gas capable of reducing arcing above the switching fluid, for closing the well under predetermined conditions to maintain the switching fluid within the well and the bellows substantially free of the arc reducing gas.

Other objects of this invention will become apparent from the following description when taken in conjunction with the accompanying drawing, in which:

Figure 1 is a view in elevation and partly in section, of the switching apparatus of this invention;

Fig. 2 is a plan view of one of the conductor elements utilized in the apparatus of Fig. 1;

Fig. 3 is a plan view of one of the bonding spacer members utilized in the apparatus of Fig. 1;

Fig. 4 is a plan view of a part of the composite spacer member of Fig. 3;

Fig. 5 is a view in section of the elements shown in Fig. 4, taken along the line V—V of Fig. 4; and Fig. 6 is a view in section of the upper end portion of the sealed switching apparatus of Fig. 1.

Referring to the drawing, and particularly Fig. 1, this invention is illustrated by reference to a switching apparatus 10. The switching apparatus 10 comprises a suitable base member 12 on which a plurality of conductor members 14 are stacked in spaced relation and maintained in spaced relation by means of a plurality of insulating spacer members 16 disposed adjacent the conductor leaves. At the upper end of the alternate stacked assembly of the conductor leaves 14 and the spacer members 16 there is positioned a suitable top member 18 which carries a suitable container or chamber 20 which functions as a gas chamber. In the embodiment illustrated, the gas chamber 20 is preferably formed of a bellows, the reason for which will be explained more fully hereinafter.

The conductor members 14 are of any suitable conducting material, such as stainless steel or the like, and are preferably of a substantially rectangular shape having one end tapered to provide a terminal or tap 19 to which leads may be connected as is illustrated in Fig. 2. The spacer members 16 are of any suitable insulating material which can be bonded to the conductor members 14 and which will maintain a predetermined space between the conductor members or leaves 14.

As described in my copending application Serial No. 387,098, filed April 5, 1941, the spacer members 16, of the switching apparatus 10 are preferably formed of two washer members 22 and 24 of fibrous material, as illustrated in Figs. 3, 4 and 5. The washer member 24 is of a size to fit within the opening of the washer 22, both washers, however, being of substantially the same thickness. In practice, the washer 22 is provided with a thermoplastic bonding material, the washer 24 being substantially free from any such bonding material and having flared edges 26 which cooperate to prevent flow of the bonding material from the washer 22 over the face of the washer 24. The washer 22 may be either impregnated with or provided with a film of thermoplastic bonding material, such as a hydrolized polyvinyl ester and preferably, a partially hydrolized vinyl acetate.

In assembling the alternately stacked conductor leaves 14 and the spacer members 16, the conductor members 14 are stacked alternately with the spacer members 16 on the base member 12 with the conductor members 14 so disposed that the terminal 19 of each succeeding conductor member extends outwardly from a different side of the stack with the terminal being adjacent one edge of the rectangularly shaped conductor member 14. By reversing the upper and lower sides of every fifth conductor member in the stack, it is possible to provide eight stacks of the staggered terminals extending outwardly from the stacked assembly. Each of the conductor members is also provided with a central opening 28 which cooperates with the opening 30 in each of the washer members 24 to provide a well 32 in the stack when the leaves and spacer members are assembled. Reenforcing rods 34 of fibrous insulating material are also provided and disposed in spaced relation about the well 32 and extend through suitable spacing openings in the conductor members 14 and the washers 22 with their opposite ends terminating in spaced recesses in the base member 12 and the top member 18.

A bellows 36 secured as by welding (not shown) to an outwardly extending flange member 38 is disposed to be secured to the base member 12. As illustrated, the flange member 38 is secured to the flange 40 of the base member 12 by means of a fibrous gasket 42 of insulating material impregnated or coated with the same thermoplastic bonding medium which is employed for sealing the conductor members and the spacer members. The flanges 38 and 40 and the gasket 42 are also provided with spaced openings for receiving the bolts 44 for mounting the switching apparatus when assembled to a flange 46 which may be suitably carried by a panelboard (not shown).

As illustrated, the alternate stacked assembly of the conductor leaves 14 and the spacer members 16 begins and ends with one of the spacer members 16. Thus, one of the spacer members 16 seats on the base member 12 and the top member 18 seats on a spacer member 16. Both the base member 12 and the top member 18 are provided with an aligned opening to constitute an extension of the well 32. The aligned openings in both the base member and the top member provide a means for communicating from within the bellows 36 to the well 32, and from the well 32 to within the gas chamber or bellows 20.

The bellows 20 carried by the top member 18 is secured to an annular rim 48 on its upper surface as by welding (not shown), so as to provide a leak-proof joint therebetween. The upper end of the bellows is formed of a substantially heavy plate 50, as illustrated in Figs. 1 and 6, which is sealed to the upper edge of the bellows as by welding. This plate 50 carries a downwardly projecting valve member 52 which, in the normal operative position for the bellows 20 as illustrated in Fig. 6, is spaced from the upper end of the well 32. The valve 52, however, is so aligned with respect to the well 32 that when pressure is applied to the bellows 20, as illustrated in Fig. 1 and explained hereinafter, the valve will seat in and close the upper end of the well 32. The plate 50 is also provided with a duct 54 which opens into the bellows 20.

With the elements assembled as described, the assembly is subjected to a temperature of about 120° C. while applying pressure to cause the thermoplastic bonding material carried by the spacer member 22 and the gasket 42 to bond the different elements into an integral leak-proof structure. Usually a pressure of the order of 400 pounds per square inch at the temperature given will effect the bonding action. When bonded in this manner, it is found that the bonding material flows to and firmly bonds the reenforcing members 34 in the assembly while the washer member 24 of the spacer member 16 limits the flow of the thermoplastic material towards the well 32 formed in the stack. As thus sealed, the stacked assembly is resistant to mechanical shock and is leaf-proof.

In practice, with the structure sealed as described, the well 32 and the space in the bellows 36 and the gas chamber or bellows 20 are evacuated and a predetermined quantity of liquid conducting material, such as mercury 56, is introduced into the bellows and the well through the duct 54 provided in the top of the bellows 20. A gas which is capable of reducing arcing, such as hydrogen, is then introduced into the gas chamber or bellows 20 and the well 32 above the mercury, after which the duct 54 is sealed off as by means of soldering.

The apparatus described hereinbefore has proven to be very satisfactory for effecting switching operations where the terminals 19 of the conducting leaves 14 are connected to apparatus to be controlled and pressure is applied to the bellows 36 for effecting a flow of the mercury 56 upwardly through the well 32 to progressively bridge the conducting members 14. However, where the switching apparatus described is to be moved or shipped, it is found that it is not always possible to maintain the switching apparatus in a vertical position, and that consequently, the mercury 32 enters the bellows 20 or the gas within the bellows 20 often works its way through the well 32 into the bellows 36, especially if the switching apparatus is placed in a horizontal position or up-ended. It has been found to be substantially impossible to remove all of the entrapped gas from the convolutions of the bellows 36 once the gas is admitted to the bellows 36. For this reason, it is essential that provision be made under predetermined conditions to maintain the gas within the bellows 20 substantially free from the mercury and the mercury within the well 32 and the bellows 36 substantially free from the gas. The valve 52 is effective when actuated to close the upper end of the well 32 to maintain the gas and the mercury substantially separated under predetermined conditions.

Referring again to Fig. 1, there is illustrated a preferred embodiment of this invention for maintaining the gas and mercury so separated within the switching apparatus as to be substantially free from each other. In this embodiment, a cap 58 is provided and disposed to fit over the upper bellows 20 and to seat against the top member 18. The cap 58 may be either a solid cap or a skeleton frame, as desired, the lower edges of the cap 58 being provided with spaced openings for receiving the screws 60 which thread into suitable spaced openings in the top member 18 for retaining the cap 58 in position over the bellows 20.

As illustrated, in order to apply pressure to the bellows 20 to actuate the valve 52 to close the upper end of the well 32, a spring member, in this embodiment illustrated as being a coil spring 62, is positioned between the cap 58 and the plate 50 of the bellows 20. The opposite ends of the spring 62 fits about the centrally located projections 61 and 63 of the cap 58 and plate 50 respectively. The spring member 62 may be secured, as by soldering it or otherwise, in position about the projection 61 of the cap for facilitating the mounting of the cap and spring to actuate the valve 52. Whether carried by the cap 58 or manually positioned each time it is desired to actuate the valve 52, it is found that when the cap 58 is removably secured to the end member 18, as by means of the spaced screws 60, sufficient pressure is applied to the upper end of the bellows 20 to actuate the valve 52 to seat in and close the upper end of the well 32. When the cap 58 is removed from its assembled position with the top member 18, it is found that the valve 52 is actuated away from the upper end of the well 32 by reason of the expansion of the bellows 20 to the position as shown in Fig. 6, wherein the gas and mercury may flow into and out of the bellows 20 depending upon the degree of pressure applied to the bellows 36.

When it is desired to ship the switching apparatus or to move it from one position to another, where there is danger of the switching apparatus being tilted from the vertical position, sufficient pressure is applied to the bellows 36 by any suitable means, either mechanically or manually, to force the mercury 56 upwardly through the well 32 until it reaches the upper end of the well 32. With this pressure applied to the bellows 36, substantially all of the gas within the sealed structure is so forced into the bellows 20 that when pressure is applied to the bellows 20, as by means of fitting the removable cap 58 and the spring 62 associated therewith in operative position with respect to the bellows 20, the valve 52 seats in and closes the upper end of the well 32 to effectively maintain the gas within the chamber 20 separated from the mercury within the well 32 and the bellows 36. Thus, the switching apparatus of this invention can be readily moved without danger, and when set up in its place of operation, is readily rendered operative to effect the desired switching operations. This invention makes it possible to calibrate the switching apparatus 10 prior to shipping it to the destination where the switching apparatus is to be employed without the necessity of again calibrating the switching apparatus at the destination.

I claim as my invention:

1. In a sealed switching apparatus having a plurality of conductor members disposed in spaced relation, in combination, a conducting liquid disposed in the switching apparatus, the conducting liquid being disposed for movement to progressively bridge the conductor members, a chamber associated with the spaced conductor members and disposed to receive the conducting liquid under predetermined conditions, a gas capable of reducing arcing carried in the sealed apparatus in the chamber and above the conducting liquid, and a valve disposed within the chamber, the valve being disposed for operation under predetermined conditions to close the chamber from the remaining portion of the sealed apparatus to maintain the gas within the chamber substantially free from the conducting liquid and the conducting liquid in the remaining portion of the sealed apparatus substantially free from the gas.

2. In a switching apparatus, a well adapted to receive a conducting liquid, the well being formed of a stack of alternately disposed conductor members and insulating spacer members having aligned openings therein, a bellows disposed at the lower end of the stack communicating with the well, a conducting liquid carried in the bellows, the bellows being disposed for operation to deliver the conducting liquid into the well to progressively bridge the conductor members, a chamber disposed at the upper end of the stack communicating with the well, a gas capable of reducing arcing carried in the chamber and the well above the conducting liquid, and a valve disposed within the chamber associated with the upper end of the well, the valve being disposed for operation under predetermined conditions to close the upper end of the well to maintain the gas within the chamber substantially free from the conducting liquid and the conducting liquid within the well and bellows substantially free from the gas.

3. In a switching apparatus, a well adapted to receive a conducting liquid, the well being formed of a stack of alternately disposed conductor members and insulating spacer members having aligned openings therein, a bellows disposed at the lower end of the stack communicating with the well, a conducting liquid carried in the bellows, the bellows being disposed for operation to deliver the conducting liquid into the well to progressively bridge the conductor members, another bellows disposed at the upper end of the stack communicating with the well, a valve carried within the upper bellows, the upper bellows being disposed for operation to actuate the valve to close the upper end of the well, and a removable holding means associated with the upper bellows, the holding means being disposed to apply a restraining force to the upper bellows to maintain the valve in position to close the upper end of the well.

4. In a switching apparatus, a well adapted to receive a conducting liquid, the well being formed of a stack of alternately disposed conductor members and insulating spacer members having aligned openings therein, a bellows disposed at the lower end of the stack communicating with the well, a conducting liquid carried in the bellows, the bellows being disposed for operation to deliver the conducting liquid into the well to progressively bridge the conductor members, another bellows disposed at the upper end of the stack communicating with the well, a valve carried within the upper bellows, the upper bellows being disposed for operation to actuate the valve to close the upper end of the well, a cap disposed external of the upper bellows and removably secured to the stack assembly, and a compression means disposed between the cap and the upper bellows, the compression means applying a restraining force to the upper bellows to maintain the valve in position for closing the upper end of the well.

5. In a switching apparatus, a well adapted to receive a conducting liquid, the well being formed of a stack of alternately disposed conductor members and insulating spacer members having aligned openings therein, a bellows disposed at the lower end of the stack communicating with the well, a conducting liquid carried in the bellows, the bellows being disposed for operation to deliver the conducting liquid into the well to progressively bridge the conductor members, another bellows disposed at the upper end of the stack communicating with the well, a valve carried within the upper bellows, the upper bellows being disposed for operation under predetermined pressure to effect a movement of the valve to close the upper end of the well, and means external of the upper bellows for maintaining the upper bellows under the predetermined pressure and the valve in position to close the upper end of the well, the external means being removable to release the pressure on the upper bellows, the upper bellows effecting a movement of the valve away from the upper end of the well when the pressure is released to effectively establish the communication between the upper bellows and the well.

6. In a switching apparatus, a well adapted to receive a conducting liquid, the well being formed of a stack of alternately disposed conductor members and insulating spacer members having aligned openings therein, a bellows disposed at the lower end of the stack communicating with the well, a conducting liquid carried in the bellows, the bellows being disposed for operation to deliver the conducting liquid into the well to progressively bridge the conductor members, a chamber disposed at the upper end of the stack communicating with the well, a gas capable of reducing arcing carried in the chamber and the well above the conducting liquid, a valve disposed within the chamber associated with the upper end of the well, the valve being disposed for operation under predetermined conditions to close the upper end of the well to maintain the gas within the chamber substantially free from the conducting liquid and the conducting liquid within the well and bellows substantially free from the gas, and means external of the chamber for operating the valve to close the upper end of the well, the operating means being removable to effect the operation of the valve away from the upper end of the well to establish the communication between the chamber and the well and allow the gas and conducting liquid to flow therebetween in accordance with the operation of the bellows.

KIRK A. OPLINGER.